United States Patent
Gras et al.

(10) Patent No.: US 6,204,351 B1
(45) Date of Patent: *Mar. 20, 2001

(54) BLOCKED POLYISOCYANATES WITH BUILT-IN HALS STABILIZER

(75) Inventors: Rainer Gras, Bochum; Elmar Wolf, Recklinghausen, both of (DE)

(73) Assignee: Huels Aktiengesellschaft, Marl (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/302,262

(22) Filed: Apr. 30, 1999

Related U.S. Application Data

(63) Continuation of application No. 08/919,287, filed on Aug. 28, 1997, now Pat. No. 5,955,558.

(30) Foreign Application Priority Data

Feb. 11, 1996 (DE) ............................................ 196 45 166
Nov. 2, 1996 (DE) ............................................ 196 45 166

(51) Int. Cl.[7] .................................................... C08G 18/80
(52) U.S. Cl. ........................... 528/45; 528/73; 252/182.2; 252/182.22; 546/244
(58) Field of Search .................... 528/45, 73; 252/182.2, 252/182.22; 546/244

(56) References Cited

U.S. PATENT DOCUMENTS

| | | | |
|---|---|---|---|
| 4,102,870 | 7/1978 | Hofmann et al. | 528/73 |
| 4,145,512 | 3/1979 | Uhrhan et al. | 528/73 |
| 5,504,178 | 4/1996 | Shaffer et al. | 528/45 |
| 5,508,349 | 4/1996 | Clark et al. | 525/124 |
| 5,955,558 | * 9/1999 | Gras et al. | 528/45 |

FOREIGN PATENT DOCUMENTS

| | | |
|---|---|---|
| 40 10 444 | 10/1990 | (DE) . |
| 0 047 967 | 3/1982 | (EP) . |

* cited by examiner

*Primary Examiner*—Rachel Gorr
(74) *Attorney, Agent, or Firm*—Oblon, Spivak, McClelland, Maier & Neustadt, P.C.

(57) ABSTRACT

Partially or completely blocked polyisocyanates having an built-in HALS stabilizer.

11 Claims, No Drawings

BLOCKED POLYISOCYANATES WITH BUILT-IN HALS STABILIZER

This application is a continuation of application Ser. No. 08/919,287 filed on Aug. 28, 1997 now U.S. Pat. No. 5,955,558.

BACKGROUND OF THE INVENTION

1. Field of the Invention

The present invention relates to blocked polyisocyanates having a built-in HALS stabilizer, a process for their preparation, and a process for producing polyurethane (PUR) powder coatings.

2. Discussion of the Background

Blocked polyisocyanates are used for producing heat-curable one pack PUR baking systems which are storage stable. The masking or blocking of polyisocyanates is a well known way of affording temporary protection for isocyanate groups. The most common blocking agent used is ε-caprolactam, which forms with isocyantes a stable compound up to about 130–14 0° C. and which unblocks the blocked NCO groups at baking temperatures of 180° C. or higher.

The isocyantes preferred for heat-curable pulverulent compositions are (cyclo)aliphatic diisocyantes because of their excellent aging characteristics compared with aromatic isocyantes, which have the disadvantage of yellowing on baking, and aging in particular.

ε-Caprolactam-blocked isocyanate-polyol adducts based on isphorone diisocyanate (IPDI) in particular have become established as PUR powder curing agents. The reason for this is very probably the difference in reactivity between the two NCO groups in the IPDI, which permits controlled adduct formation from IPDI and the polyol (NCO:)H=2:1) with a narrow molecular weight distribution. A narrow molecular weight distribution of the curing agent is a prerequisite for good flow of the cured powder.

ε-Caprolactam-blocked IPDI melts at 53–55° C. Owing to the low melting temperature, the powders produced from this blocked IPDI cake together in storage. To increase the melting point, IPDI is subjected to a chain-lengthening reaction with polyol (NCO:OH=2:1) before ε-caprolactam blocking. DE-A-21 05 777 mentions polyols such as trimethylolpropane, trimethyl-1,6-hexanediol and diethylene glycol as chain lengtheners for IPDI and DE-A-25 42 191 mentions mixtures of di- and trifunctional polyols. Both are incorporated herein by reference.

The PUR powder coatings prepared with these curing agents have to be stabilizer against degradation by radiation. The stabilizers used are the known UV stabilizers based on benzotriazole (e.g. TINUVIN® 326) or based on strongly sterically hindered amines (e.g. TINUVIN® 770). The disadvantage with PUR powder coatings stabilized with these stabilizers is the limited lifetime of the stabilizers, which migrate to the surface over time and are destroyed there.

OBJECTS OF THE INVENTION

It is an object of the present invention to provide partially or totally blocked polyisocyanates with which it is possible to produce stabilized PUR powder coatings without addition of a UV stabilizer.

The present invention accordingly provides partially or completely blocked polyisocyanates having a built-in HALS stabilizer, comprising blocking agents and adducts of diisocyantes and polyols of the general formula:

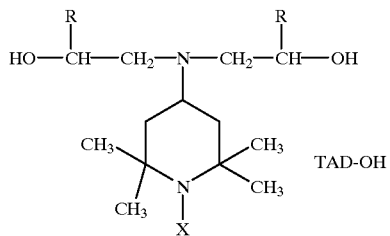

where R is H, alkyl, cycloalkyl of 1–20 carbon atoms and X is H,

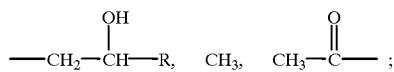

where R is as defined above, the adducts preferably containing 2–20 NCO equivalents per OH equivalent.

DETAILED DESCRIPTION OF THE INVENTION

Diisocyantes particularly useful for the purposes of this invention are especially diisocyantes having an aliphatic, cycloaliphatic or (cyclo)aliphatic structure. Examples include those recited in Houben-Weyl, Methoden der organischen Chemie, volume 14/2, p. 61 ff. and J. Liebigs Annalen der Chemie, volume 563, p. 75–136, both incorporated by reference herein. Preference is generally given to the industrially readily obtainable aliphatic, cycloaliphatic and (cyclo)aliphatic diisocyantes of 6–14 carbon atoms, especially hexamethylene diisocyanate (HDI), 3-isocyanatomethyl-3,5,5-trimethylcoclohexyl isocyanate (IPDI) and dicyclohexylmethane 4,4'-diisocyanante (HMDI). Adducts of the diisocyantes and polyols may be made by any art-recognized process and is within the skill of the ordinary artisan.

Blocking agents particularly useful for the purposes of this invention are especially the compounds customary in PUR chemistry, such as oximes, acetone oxime, methyl ethyl ketoxime, methyl isobutyl detoximes, diisobutyl ketoxime and also acetophenone oxime, lactams, e.g., ε-caprolactam, seconday monoamines, e.g., diisobutylamine, dicyclohexylamine, tirazoles, e.g. 1,2,4-triazole, and also irreversible blocking agents such as alcohols, for example, methanol, ethanol, isporpanol, 2-ethylhexanol, which can be used in a mixture with the above mentioned reversible blocking agents. Preference is given to using ε-caprolactam, methyl ethyl ketoxime, and/or 1,2,4-triazole.

The present invention further provides a process for preparing partially or completely blocked polyisocyanates having a built-in HALS stabilizer, which comprises reacting the blocking agent with diisocyanate adducts preferably containing 2–8 NCO equivalents per OH equivalent.

The blocked polyisocyanates of the invention are preferably prepared in two stages, the first stage being a reaction of the diisocyanate with the TAD-OH. In a preferred reaction, an initial charge of diisocyanate at 80–120° C. is admixed with the TAD-OH in the course of a 2–3 h under nitrogen and in the absence of moisture with stirring in such a way that at least 2 and not more than 20, preferably 4–10, equivalents of NCO of the diisocyanate react per OH equivalent of the TAD-OH. In the second stage, the remaining NCO groups are then partially or totally blocked: the blocking agent mixture is added a little at a time to the diisocyanates-TAD-OH adduct at about 100–140° C. in such a way that the temperature does not rise above 150° C. On completion of the blocking agent or blocking agent mixture addition, the reaction mixture is heated at 120–140° C. for a further 2 h to complete the reaction. To speed up the reaction, a conventional urethanziation catalyst can be added, for example organotin compounds or triethylenediamine (Dabco), in an amount of 0.01 to 0.1% by weight as catalyst, based on the total mixture.

The following process has proved particularly advantageous for preparing the blocked compounds of the invention: in the first stage, the diisocyantes are reacted with blocking agent or blocking agent mixture at 80–150° C., and the second stage features the reaction of the remaining NCO groups with the polyols.

Examples of suitable TAD-OH compounds are 4-bis(2-hydroxyethyl)amino-2,2,6,6-tetramethylpiperidine, 4-bis(2-hydroxypropyl)amino-2,2,6,6-tetramethylpiperidine, 4-bis(2-hydroxybutyl)amino-2,2,6,6-tetramethylpiperdine, 4-bis(2-hydroxyethyl)amino-1-(2-hydroxyethyl)-2,2,6,6-tetramethylpiperidine ("TAD-triol"). In principle, the process of the invention can be carried out with any diols and/or triols which can be prepared in any known manner, or preferably according to the following reaction equation:

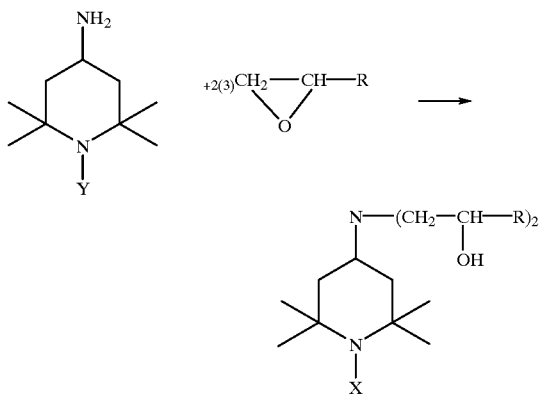

R:H, alkyl (e.g.; $C_1$–$C_{20}$), cycloalkyl of 1–20 carbon atoms;

$$X: H,\ CH_2\text{---}\underset{OH}{CH}\text{---}R_1CH_3CH_3\text{---}\overset{O}{\underset{}{C}};$$

$$Y: H,\ CH_3,\ CH_3\text{---}\overset{O}{\underset{}{C}};$$

The following polyols are used with particular preference:

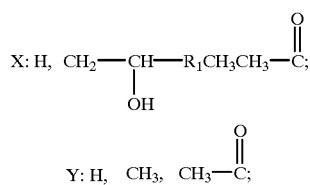

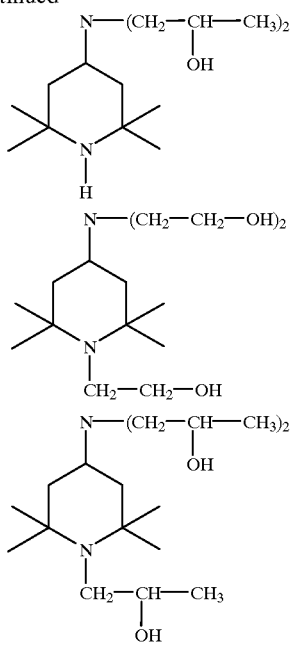

The TAD-OH may be prepared in a 1-stage reaction TAD+monoepoxide at 100–130° C. 4-Amino-2,2,6,6-tetramethylpiperidine (TAD0 may be prepared in the process described in DE-A-28 01 172, incorporated herein by reference, by reduction animation of the triacetoneamine prepared from acetone and $NH_3$.

The compounds of the invention are generally compounds of the molecular weight range 500–1000, preferably 600–800. the products of the process have melting points (softening temperature) of 65–140° C., preferably 70–120° C., and a glass transition temperature of 25–100° C., preferably 35–85° C. Preferred compounds of the invention are additionally characterized by their containing the strongly sterically hindered amino group (calculated as NH) in an amount of 0.1–2% by weight, preferably 0.8–1.4% by weight, a free NCO group content of not more than 5% by weight, and a terminal blocked isocyanate group content (calculated as NCO) of 2–18% by weight, preferably 8–16% by weight.

The products of the process are useful as curing agents for higher functional thermoplastic compounds having Zerevitinov-active hydrogen atoms. Combined with such (active hydrogen) compounds, the products of the process lead to systems which cure at above 160° C., preferably at 180–200° C., to form high grade plastics.

The most important field of application for such systems is their use as permanently stabilized binders for (PUR) coating systems, especially of PUR one pack baking finishes and PUR powder coatings.

The present invention accordingly also provides heat-curable PUR powder coatings which are stable in storage and which are based on the novel blocked diisocyanate adducts and OH-containing polymers, of the following composition:
a) 100 parts by weight of OH containing polymer
b) 10–90 parts by weight of blocked polyisocyanate
c) 0–160 parts by weight of pigments
d) 0–200 parts by weight of customary fillers
e) 0–5 parts by weight of catalyst
f) 0.5–5 parts by weight of flow agent with an OH/NCO ratio of 1:05 to 1.2, preferably 1:08 to 1.1, especially 1:1.

Constituent a) can in principle be any polymer containing more than two OH groups and melting at not less than 70° C. the polymers in question are preferably polyetherpolyols, polyesteramidepolyols, polyuethanepolyos, hydroxylated acrylic resins, etc., whose OH groups are intended for crosslinking with the blocked diisocyanates of the invention. Polyesterpolyols are particularly preferred for the purposes of the invention among the numerous possible hydroxyl-bearing polymers. Such polyesterpolyols preferably have a weight average molecular weight between 1000–3000, more preferably between 1500–2500, and an OH number of 20–200, preferably 30–150, mg of KOH/g, a viscosity <60,000, preferably <40,000 Pars at 160° C., and a melting point >70° C. and <120° C., preferably of 75–100° C. Such polyesterpolyols are described for exemple in DE-A-19 57 483, DE-A-25 42 191, DE-A-30 04 876 and DE-A-31 43 060 all incorporated herein by reference.

Catalysts can be added to increase the gel rate of the heat-curable powder coatings. The catalysts used are preferably organotin compounds such as dibutyltin dilaurate (DBTL), tin(II) octoate, dibutyltin maleate, etc. The maount of catalyst added is 0.03–0.5% by weight, preferably 0.5–0.15% by weight, including any catalyst already present from the blocked polyisocyanates.

PUR powder coatings are prepared by mixing the isocyanate component with a suitbale hydroxyl-containing polymer and optionally catalysts and also pigments and customary auxiliaries such as fillers and flow agents, for example silicone oil, acrylate resins, and homogenizing in the melt. Homogenization can be accomplished in suitable apparatus, for example treatable kneaders, but preferably by means of extrusion, in which case upper temperature limits of 130–140 ° C. should not be exceeded. After cooling to room temperature and after suitbale comminution, the extruded mass is ground to the ready-to-spray powder. The ready-to-spray powder may be applied to suitable substrates according to the known processes, for example by electrostatic powder spraying, fluidized bed sintering, electrostatic fluidized bed sintering. After powder application, the coated workplaces are heated at 150–220° C. for 60 to 4minutes, preferably at 160–200° C. for 30 to 6 minutes, for curing.

The PUR powder coatings of the invention are notable for excellent weathering and very good color stability. German application 196 45 166.3 filed Nov. 2, 1996, is incorporated herein by reference.

EXPERIMENTAL

A) 1. Preparation of 4-bis (2-hydroxyethyl)amino-2,2,6,6-tetramethylpiperidine (TAD-2 EO)

780 parts by weight of 4-amino-2,2,6,6-tetramethylpiperidine (TAD) were slowly admixed with 484 parts by weight of ethylene oxide (EO) in a 21 steel autoclave at 100–120° C. under nitrogen. The pressure rose to a maximum of 7 bar. After the reaction had ended, the autoclave was decompressed and its contents were subjected to a fractional distillation.

This yielded 203 parts by weight of 4-(2-hydroxyethyl) amino-2,2,6,6-tetramethylpiperidine having a boiling point of 120–145° C./0.27 mbar and, as the main fraction, 798 parts by weight of 4-bis(2-hydroxyethyl)amino-2,2,6-tetramethylpiperidine having a boiling point of 170–173° C./0.20 /mbar.

A) 2. Preparation of 4-bis(2-hydroxypropyl)amino-2,2,6,6-tetramethylpiperidine (TAD-2-PO)

TAD-2 PO was prepared similarly to TAD-2 EO by using propylene oxide instead of ethylene oxide. The TAD-2 PO obtained had a melting point of 97–102° C. and a base number of 410 mg of KOH/g.

A) 3. Preparation of 4-bis(2-hydroxyethyl)amino-1-hydroxyethyl-2,2,6,6-tetramethylpiperidine (TAD-3 EO)

780 parts by weight of TAD and 700 parts by weight of ethylene oxide were reacted similarly to Example 1. The resulting TAD-3 EO had a base number of 385 mg of KOH/g.

B) Preparation of Blocked Agents

EXAMPLE 1

244 parts by weight of 4-bis(hydroxyethyl)amino-2,2,6,6-tetramethylpiperidine (TAD-2 EO) were added a little at a time at 80° C. to 444 parts by weight of IPDI, and heating was continued until the NCO content had reached 12.2%. 226 parts by weight of $\epsilon$-caprolactam were then added to the reaction mixture at 120° C. in such a way that the temperature did not rise above 130° C. On completion of the $\epsilon$-caprolactam addition, the reaction mixture was heated at 120° C. for a further 2 h to complete the reaction.

Free NCO content: 0.4%
Total NCO content: 9.05
Amine content: 2.18 mmol of $NH_2/g$
Melting point: 92–98° C.

EXAMPLE 2

The completion of Example 2 differs from Example 1 only in the order in which the reactants were reacted.

226 parts by weight of $\epsilon$-caprolactam were added at 100° C. to 444 parts by weight of IPDI in such a way that the temperature did not rise above 110° C. Once an NCO content of 12.5% had been achieved, 244 parts by weight of TAD-2 EO were added a little at a time at 120° C. in such a way that the temperature did not rise above 130° C. On completion of the TAD-2 EO addition, heating was continued at 120° C. for a further 2 h to complete the reaction.

Free NCO content: 0.5%
Total NCO content: 9.1%
Amine content: 2.18 mmol of $NH_2/g$
Melting point: 93–97° C.

EXAMPLE 3

Example 1 was repeated using 66 parts by weight of IPDI, 244 parts by weight of TAD-2 EO and 452 parts by weight of $\epsilon$-caprolactam as blocking agent in reaction step 2.

Free NCO content: 0.7%
Total NCO content: 12.3%
Amine content: 1.46 mmol of $NC_2/g$
Metaling point: 85–90° C.

EXAMPLE 4

Example 1 was repeated using 888 parts by weight of IPDI, 244 parts by weight of TAD-2 EO and 678 parts by weight of $\epsilon$-caprolactam as blocking agent in reaction step 2.

Free NCO content: 0.6%
Total NCO content: 13.9%
Amine content: 1.1 mmol of $NH_2/g$
Melting point: 85–90° C.

EXAMPLE 5

272 parts by weight of 4-(bis-$\beta$-hydroxypropyl)amino-2,2,6,6-tetramethylpiperidine were added a little at a time at 80° C. to 1110 parts by weight of IPDI, and heating was continued at 80° C. until the NCO content had reached 24.5%. 904 parts by weight of ε-caprolactam were then added to the reaction mixture at 100° C. in such a way that the temperature did not rise above 110° C. On completion of the ε-caprolactam addition, the reaction mixture was heated at 110° C. for a further 2 h to complete the reaction.

Free NCO content: 0.6%
Total NCO content: 14.7%
Amine content: 0.87 mmol of $NH_2/g$
Melting point: 67–73° C.

EXAMPLE 6

Example 1 was repeated using 888 parts by weight of IPDI, 288 parts by weight of TAD-3 EO and 565 parts by weight of ε-caprolactam as blocking agent.

Free NCO content: 0.4%
Total NCO content: 11.91%
Amine content: 1.12 mmol of $NH_2/g$
Melting point: 95–97° C.

EXAMPLE 7

Example 1 was repeated using 1110 parts of IPDI, 288 parts by weight of TAD-3 EO and 791 parts by weight of ε-caprolactam as blocking agent.

Free NCO content: 0.3%
Total NCO content: 13.1%
Amine content: 0.9 mmol of $NH_2/g$
Melting point: 85–87° C.

EXAMPLE 8

Example 1 was repeated using 777 parts by weight of IPDI, 144 parts by weight of TAD-3 EO and 621 parts by weight of ε-caprolactam as blocking agent.

Free NCO content: 0.4%
Total NCO content: 14.66%
Amine content: 0.8 mmol of $NH_2/g$
Melting point: 80–82° C.

EXAMPLE 9

Example 1 was repeated using 66 parts by weight of IPDI, 244 parts by weight of TAD-2 EO and 395.5 parts by weight of ε-caprolactam as blocking agent in reaction step 2.

Free NCO content: 1.4%
Total NCO content: 12.5%
Amine content: 1.51 mmol of $NH_2/g$
Melting point: 79–84° C.

EXAMPLE 10

Example 1 was repeated using 1110 parts by weight of IPDI, 288 parts by weight of TAD-3 EO and 734.5 parts by weight of ε-caprolactam as blocking agent.

Free NCO content: 0.8%
Total NCO content: 13.5%
Amine content: 0.94 mmol by $NH_2/g$
Melting point: 80–82 ° C.

EXAMPLE 11

Example 1 was repeated using 524 parts by weight of HMDI, 244 parts by weight of TAD-2 EO and 266 parts by weight of ε-caprolactam as blocking agent in reaction step 2.

Free NCO content: 0.1%
Total NCO content: 8.3%
Amine content: 2.01 mmol by $NH_2/g$ Melting point: 87–89° C.

EXAMPLE 12

Example 1 was repeated using 1048 parts by weight of HMDI, 288 parts by weight of TAD-3 EO and 565 parts by weight of ε-caprolactam as blocking agent in reaction step 2.

Free NCO content: 0.2%
Total NCO content: 10.9%
Amine content: 1.05 mmol of $NH_2/g$
Melting point: 91–93° C.

EXAMPLE 13

Example 1 was repeated using 504 parts by weight of HDI, 288 parts by weight of TAD-3 EO and 339 parts by weight of ε-caprolactam as blocking agent in reaction step 2.

Free NCO content: 0.1%
Total NCO content: 11.0%
Amine content: 1.77 mmol of $NH_2/g$
Melting point: 56–58° C.

EXAMPLE 14

Example 1 was repeated using 666 parts by weight of IPDI, 244 parts by weight of TAD-2 EO and 348 parts by weight of methyl ethyl ketoxime as blocking agent in reaction step 2.

Free NCO content: 0.1%
Total NCO content: 13.2%
Amine content: 1.58 mmol of $NH_2/g$
Melting point: 67–70° C.

EXAMPLE 15

Example 1 was repeated using 666 parts by weight of IPDI, 288 parts by weight of TAD-3 EO and 207 parts by weight of 1,2,4-triazole in reaction step 2.

Free NCO content: 0.1%
Total NCO content: 10.7%
Amine content: 1.70 mmol of $NH_2/g$
Melting point: 135–137° C.

EXAMPLE 16

Example 1 was repeated using 786 parts by weight of HMDI, 244 parts by weight of TAD-2 EO and 276 parts by weight of 1,2,4-triazole in reaction step 2.

Free NCO content: 0.2%
Total NCO content: 12.6%
Amine content: 1.51 mmol of $NH_2/g$
Melting point: 93–95° C.

EXAMPLE 17

Example 1 was repeated using 504 parts by weight of HDI, 288 parts by weight of TAD-3 EO and 207 parts by weight of 1,2,4-triazole in reaction step 2.

Free NCO content: 0.1%
Total NCO content: 12.5%
Amine content: 2.00 mmol of $NH_2/g$
Melting point: 76–78° C.

Polyol Component

General Method of Preparation

The starting components—terephthalic acid (TA), dimethyl terephthalate (DMT), 1,6-hexanediol (HO), neopentylglycol (NPG), 1,4-dimethylolcyclohexame (DMC) and trimethylolpropane (TMP)—are introduced into a reactor and heated by means of an oil bath. After most of the materials have melted, 0.5% by weight of di-n-butyltin oxide is added as catalyst at 160° C. The first methanol elimination occurs at about 170° C. The temperature is raised to 220 to 230° C. over 6 to 8 hours, and the reaction is completed over a further 12 to 15 hours. The polyester is cooled down to 200° C. and substantially freed from volatiles by application of a vacuum (1.33 mbar) over 30 to 45 minutes. During the entire reaction time, the bottom product is stirred and a slow stream of $N_2$ is passed through the reaction mixture.

Table 1 shows polyester compositions and polyesters on the market with their characteristic physical and chemical data.

$\mu$m. The powder thus prepared is applied at 60 kV using an electrostatic powder sprayer to degreased, optionally pretreated iron panels and baked in a through-circulation drying cabinet at temperatures between 180 and 200° C.

Flow Agent Masterbatch

10% by weight of the flow agent—a commercially available copolymer of butyl acrylate and 2-ethylhexyl acetate—are homogenized in the melt of the corresponding polyester and the mixture is comminuted after solidification.

Catalyst Masterbatch

5% by weight of the catalyst—DBTL—are homogenized in the melt of the corresponding polyester and the mixture is comminuted after solidification.

Results are shown in Tables 2–5.

TABLE 1

| | | | | | | | Polyesters | | | | |
|---|---|---|---|---|---|---|---|---|---|---|---|
| | | | | | | | | | Chemical and physical data | | |
| | | Starting components | | | | | OH | Acid | | | Viscosity |
| Ex. | TA [mol] | DMT [mol] | HD [mol] | NPG [mol] | DMC [mol] | TMP [mol] | number [mg KOH/g] | number [mg KOH/g] | m.p. [° C.] | DTA [° C.] | at from 160° C. [mPa · s] |
| 1 | 10 | 10 | 6.25 | 10.5 | 2 | 2.9 | 55–60 | 3–4 | ca. 75 | ca. 50 | =25,000 |
| 2 | | CRYLCOAT ® 280 UCB/Belgium | | | | | =50 | <10 | 100 ± 8 | 55 ± 8 | — |
| 3 | 9 | 9 | 3 | 13 | 3 | 1 | 50–56 | 3–4 | ca. 70 | ca. 50 | =10,000 |
| 4 | | ALFTALAT AN 739 Hoechst/Italy | | | | | 55–60 | 2–4 | 82–90 | >50 | 24–29,000 |

D. Polyurethane Powder Coatings

General Method of Preparation

The confined products—blocked polyisocyanates (crosslinkers), polyesters, flow agent masterbatch, optionally a catalyst masterbatch—are intimately mulled, optionally together with the white pigment, and them homogenized in an extruder at not more than 130° C. After cooling, the extrudate is broken and pin-milled to a particle size <100

Key to abbreviations in the tables which follow:

| CT | = coat thickness in $\mu$m | |
| EI | = Erichsen indentation in mm | (DIN 53 156) |
| CH | = cross hatch test | (DIN 53 151) |
| GG 60° ↗ | = Gardner gloss measurement | (ASTM-D 5233) |
| Imp. rev | = impact reverse in gm | |
| KH | = König hardness in sec | (DIN 53 157) |

TABLE 2

| | | | | | | D1 Pigmented powder coatings | | | | | | |
|---|---|---|---|---|---|---|---|---|---|---|---|---|
| Ex. D1 | 1 | 2 | 3 | 4 | 5 | 6[o)] | 7 | 8[x)] | 9 | 10 | 11[o)] | 12 |
| Formulation | | | | | | | | | | | | |
| Crosslinker of B | 31.0 | 30.76 | 26.42 | 23.69 | 21.55 | 18.02 | 24.12 | 24.12 | 22.53 | 23.11 | 19.38 | 23.11 |
| Example () | (1) | (2) | (3) | (3) | (4) | (4) | (4) | (4) | (4) | (5) | (5) | (5) |
| Polyester of C1 | — | — | 73.58 | — | — | — | — | — | — | 76.89 | 80.62 | — |
| Polyester of C2 | — | — | — | 76.31 | 78.45 | 81.98 | — | — | — | — | — | — |
| Polyester of C3 | 69.0 | 69.24 | — | — | — | — | — | — | 77.47 | — | — | — |
| Polyester of C4 | — | — | — | — | — | — | 75.88 | 75.88 | — | — | — | 76.89 |
| Comments | All formulations contain 40% by weight of $TiO_2$ (white pigment) and 0.5% by weight each of flow agent and benzoin; the OH/NCO ratio is 1:1 [o)]1:0.8; [x)]0.1% by weight of DBTL | | | | | | | | | | | |

TABLE 2-continued

D1
Pigmented powder coatings

| Ex. D1 | 1 | 2 | 3 | 4 | 5 | 6[o)] | 7 | 8[x)] | 9 | 10 | 11[o)] | 12 |
|---|---|---|---|---|---|---|---|---|---|---|---|---|
| Coating data | | | | | | | | | | | | |
| CT | 64–70 | 57–65 | 60–69 | 50–59 | 50–60 | 48–58 | 61–69 | 60–70 | 63–69 | 55–66 | 57–69 | 63–69 |
| GG 60° | 88/89 | 86/87 | 87 | 86 | 86/87 | 83/85 | 87/89 | 88/89 | 89/90 | 87/88 | 85/87 | 89 |
| CH | 0 | 0 | 0 | 0 | 0 | 0 | 0 | 0 | 0 | 0 | 0 | 0 |
| KH | 9.5/9.9 | 7/7.7 | 9.2/9.9 | 7.9/8.8 | 7.7/9.2 | 7/7.9 | 8.9/9.4 | 9.6/10 | >10 | 9.3/9.8 | 8.4/9 | 9/9.3 |
| Imp. rev. | 806.4 | 345.6 | 345.6 | 460.8 | 806.4 | 230.4 | 576 | 806.4 | >944.6 | 576 | 460.8 | 345.6 |
| Comments | Curing conditions: 200° C./8–12', 180° C./15–20' | | | | | | | | | | | |

TABLE 3

D1
Pigmented powder coatings

| Ex. D1 | 13 | 14 | 15 | 16 | 17 | 18[o)] | 19 | 20 | 21 | 22 | 23[x)] | 24[ox)] |
|---|---|---|---|---|---|---|---|---|---|---|---|---|
| Formulation | | | | | | | | | | | | |
| Crosslinker of | 27.05 | 24.28 | 25.34 | 22.57 | 23.58 | 19.8 | 25.22 | 23.15 | 20.66 | 23.15 | 23.15 | 19.42 |
| Example () | (6) | (6) | (6) | (7) | (7) | (7) | (7) | (8) | (8) | (8) | (8) | (8) |
| Polyester of C1 | 72.95 | — | — | — | — | — | — | 76.85 | — | — | — | — |
| Polyester of C2 | — | 75.72 | — | 77.43 | — | — | — | — | 79.34 | — | — | — |
| Polyester of C3 | — | — | 74.66 | — | 76.42 | 80.2 | — | — | — | — | — | — |
| Polyester of C4 | — | — | — | — | — | — | 74.78 | — | — | 76.85 | 76.85 | 80.58 |
| Comments | All formulations contain 40% by weight of TiO$_2$ (white pigment) and 0.5% by weight each of flow agent and benzoin; the OH/NCO ratio is 1:1 [o)]1:0.8; [x)]0.1% by weight of DBTL | | | | | | | | | | | |
| Coating data | | | | | | | | | | | | |
| CT | 65–86 | 59–66 | 61–69 | 63–71 | 65–75 | 66–73 | 67–78 | 60–70 | 61–67 | 65–73 | 59–71 | 63–71 |
| GG 60° | 85/87 | 86 | 88 | 87/88 | 89 | 88/89 | 89 | 87/88 | 86/87 | 88 | 87/88 | 87/89 |
| CH | 0 | 0 | 0 | 0 | 0 | 0 | 0 | 0 | 0 | 0 | 0 | 0 |
| KH | 7.5/8 | 7.5/8.1 | 9.7/9.9 | 8.3/8.7 | 9.2/9.8 | 8.7/9.1 | 8.9/9.7 | 9.6/10 | 8.8/9.6 | 8.9/9.6 | 9.3/10 | 9/9.9 |
| Imp. rev. | 681.2 | 576 | 806.4 | 460.8 | 681.2 | 576 | 681.2 | >944.6 | 460.8 | 576 | 806.4 | 681.2 |
| Comments | Curing conditions: 200° C./8–12', 180° C./15–20' | | | | | | | | | | | |

TABLE 4

D1
Pigmented powder coatings

| Ex. C | 25 | 26 | 27 | 28 | 29 | 30 | 31 | 32 | 33 | 34 | 35 | 36 |
|---|---|---|---|---|---|---|---|---|---|---|---|---|
| Formulation | | | | | | | | | | | | |
| Crosslinker of B | 23.4 | 24.4 | 23.0 | 34.7 | 25.9 | 25.8 | 22.4 | 29.2 | 26.3 | 27.4 | 23.3 | 23.4 |
| Example () | (9) | (9) | (10) | (11) | (12) | (13) | (14) | (15) | (15) | (15) | (16) | (17) |
| Polyester of C1 | — | — | — | 75.3 | — | — | — | 70.8 | — | — | — | — |
| Polyester of C2 | 76.6 | — | — | — | 74.1 | 74.2 | 77.6 | — | 73.7 | — | 76.7 | 76.6 |
| Polyester of C3 | — | 75.6 | 77.0 | — | — | — | — | — | — | 72.6 | — | — |
| Comments | All formulations contain 40% by weight of TiO$_2$ (white pigment) and 0.5% by weight each of flow agent and benzoin; the OH/NCO ratio is 1:1 | | | | | | | | | | | |
| Coating data | | | | | | | | | | | | |
| CT | 63–75 | 70–80 | 75–96 | 57–73 | 61–78 | 65–75 | 70–80 | 60–75 | 60–71 | 71–77 | 58–67 | 55–75 |
| GG 60° | 86 | 87 | 87/88 | 86 | 87 | 87/88 | 87 | 86/88 | 88 | 88/89 | 87 | 87/88 |
| CH | 0 | 0 | 0 | 0 | 0 | 0 | 0 | 0 | 0 | 0 | 0 | 0 |
| KH | 8.5/9.1 | 7.6/8.7 | 9.2/9.7 | 9.5/9.6 | 8.7/9.3 | 7.9/8.6 | 8.3/8.7 | 7.5/8.3 | 8.7/8.9 | >10 | 8.7/9.2 | 9.0/9.4 |
| Imp. rev. | 691.2 | 576 | 806.4 | 806.4 | 691.2 | 576 | 691.2 | 691.2 | 691.2 | >944.6 | 806.2 | 806.2 |
| Comments | Curing conditions: 200° C./6–12', 180° C./8–20', 170° C./15–25', 160° C./20–30' | | | | | | | | | | | |

TABLE 5

D2
Transparent powder coatings
The method described was also used to prepare,
apply and bake transparent powder coatings between 200 and 170° C.

| Ex. D2 | 1 | 2 | 3 | 4 | 5 | 6 | 7 | 8 |
|---|---|---|---|---|---|---|---|---|
| Formulation | | | | | | | | |
| Crosslinker of A | 21.55 | 22.53 | 27.05 | 25.34 | 22.57 | 23.58 | 23.15 | 20.66 |
| Example () | (4) | (4) | (6) | (6) | (7) | (7) | (8) | (8) |
| Polyester of C1 | — | — | 72.95 | — | — | — | 76.85 | — |
| Polyester of C2 | 78.45 | — | — | — | 77.43 | — | — | 79.34 |
| Polyester of C3 | — | 77.47 | — | 74.66 | — | 76.42 | — | — |
| Comments | All formulations contain 0.5% by weight of flow agent and 0.3% by weight of benzoin; the OH/NCO ratio is 1:1 | | | | | | | |
| Coating data | | | | | | | | |
| CT | 67–74 | 59–71 | 63–70 | 57–68 | 61–73 | 68–75 | 63–70 | 57–65 |
| KH | 189 | 191 | 188 | 187 | 191 | 189 | 192 | 189 |
| CH | 0 | 0 | 0 | 0 | 0 | 0 | 0 | 0 |
| EI | >10 | >10 | >10 | >10 | 9.7/10 | >10 | 9.7/10 | >10 |
| Comments | Curing conditions: 200° C./8–10', 180° C./12–20', 170°/25–30' | | | | | | | |

What is claimed as new and desired to be secured by Letters Patent of the united states is:

1. A partially or completely blocked polyisocyanate having a built-in HALS stabilizer, comprising the reaction product of a blocking agent and an adduct of a diisocyanate and a polyol of the general formula:

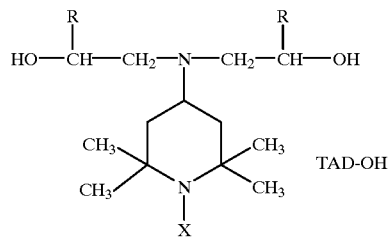

TAD-OH where R is $H_1$, alkyl, cycloakyl of 1–20 carbon atoms and

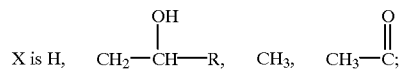

the adducts containing 2–20 NCO equivalents per OH equivalent, wherein said polyisocyanate has a glass transition temperature of 25–100° C. and a softening temperature of 65–140° C.

2. The polyisocyanate of claim 1, wherein the polyol is the reaction products of 4-amino-2,2,6,6-tetramethylpiperidine and ethylene dioxide and/or propylene oxide, of one of the following formulae:

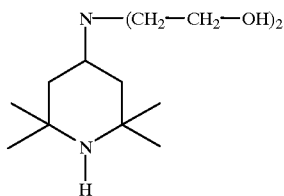

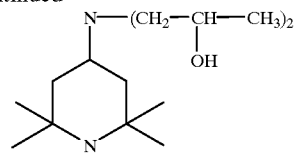

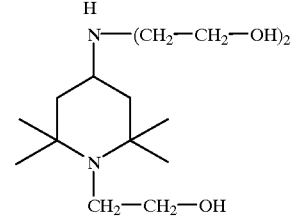

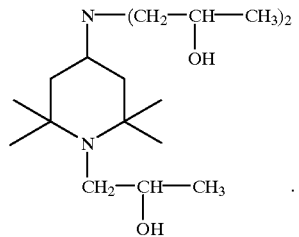

3. The polyisocyanate according to claim 1, wherein the diisocyanate is isophorone diisocyanate (IPDI), dicyclohexylmethane 4,4-diisocyanate (HMDI) and/or hexamethylene diisocyanate (HDI).

4. The polyisocyanate of claim 1, wherein said blocking agent is a reversible or irreversible blocking agent.

5. The polyisocyanate of claim 1, wherein said blocking agent is a mixture of reversible and irreversible blocking agents.

6. The polyisocyanate of claim 1, wherein the blocking agent used is ε-caprolactam, methyl ethyl ketoxime or 1,24-triazole.

7. The polyisocyanate of claim 1, wherein the blocking agent is a reversible blocking agent.

8. The polyisocyanate of claim 1, wherein said blocking agent is an irreversible blocking agent.

9. The polyisocyanate of claim 1, wherein the blocking agent used is a mono-alcohol or a monoamine.

10. The polyisocyanate of claim 1, wherein the free NCO content of said polyisocyanate is not more than 5% by weight.

11. The polyisocyanate of claim 1, wherein said polyisocyanate has a glass transition temperature of 35–85° C. and a softening temperature of 70–120° C.

* * * * *

UNITED STATES PATENT AND TRADEMARK OFFICE
CERTIFICATE OF CORRECTION

PATENT NO. : 6,204,351 B1
DATED : March 20, 2001
INVENTOR(S) : Gras et al.

It is certified that error appears in the above-identified patent and that said Letters Patent is hereby corrected as shown below:

<u>Title page,</u>
Item (30), The Foreign Application Priority Data is incorrectly listed. Item (30) should read as follows:

-- (30) Foreign Application Priority Data

Nov. 2, 1996 (DE) ..................................196 45 166 --

Signed and Sealed this

Fourteenth Day of August, 2001

Attest:

NICHOLAS P. GODICI
Attesting Officer
Acting Director of the United States Patent and Trademark Office